(12) United States Patent
Lee

(10) Patent No.: US 9,066,221 B2
(45) Date of Patent: Jun. 23, 2015

(54) METHOD AND APPARATUS OF PROVIDING A PROXIMITY-BASED SERVICE FOR PUBLIC SAFETY WITH ONE OR MORE USER EQUIPMENTS OUT OF THE CELLULAR NETWORK COVERAGE

(71) Applicant: LG ELECTRONICS INC., Seoul (KR)

(72) Inventor: Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 14/017,900

(22) Filed: Sep. 4, 2013

(65) Prior Publication Data

US 2014/0066001 A1 Mar. 6, 2014

Related U.S. Application Data

(60) Provisional application No. 61/696,776, filed on Sep. 4, 2012.

(51) Int. Cl.
*H04W 4/22* (2009.01)
*H04W 4/02* (2009.01)

(52) U.S. Cl.
CPC ............... *H04W 4/22* (2013.01); *H04W 4/023* (2013.01)

(58) Field of Classification Search
USPC ............... 455/404.2, 412.1; 715/860–863
See application file for complete search history.

(56) References Cited

U.S. PATENT DOCUMENTS

2006/0174121 A1 8/2006 Omae et al.
2009/0131021 A1* 5/2009 Vogedes et al. ............ 455/412.1
2011/0083111 A1* 4/2011 Forutanpour et al. ......... 715/863
2011/0134827 A1 6/2011 Hooli et al.
2012/0044815 A1 2/2012 Geirhofer et al.
2012/0083283 A1 4/2012 Phan et al.

FOREIGN PATENT DOCUMENTS

JP 2006-197025 A 7/2006
WO WO 2007128382 A1 * 11/2007 .......... H04W 24/023

OTHER PUBLICATIONS

3GPP TR 22.803 V0.5.0 (Aug. 2012), 3rd Generation Partnership Project; Technical Specification Group SA; Feasibility Study for Proximity Services (ProSe) (Release 12).

* cited by examiner

*Primary Examiner* — Diane Mizrahi
(74) *Attorney, Agent, or Firm* — Birch, Stewart, Kolasch & Birch, LLP

(57) ABSTRACT

A method and a user equipment (UE) are described for performing a proximity-based service (ProSe) in a cellular communication system. The UE is a public safety (PS) ProSe-enabled UE that is a member of a ProSe Group. At least one UE of the ProSe Group is not served by a cellular network, and an apparatus therefore. The PS ProSe-enabled UE checks whether it is in a location served by the cellular network, and transmits first information related to the ProSe Group to the cellular network if a condition is satisfied. The PS ProSe-enabled UE transmits a notice to a leader UE of the ProSe Group for informing that the PS ProSe-enabled UE is in a state that can be served by the cellular network when the PS ProSe-enabled UE is in the location served by the cellular network as a result of the check operation.

8 Claims, 11 Drawing Sheets

METHOD AND APPARATUS OF PROVIDING A PROXIMITY-BASED SERVICE FOR PUBLIC SAFETY WITH ONE OR MORE USER EQUIPMENTS OUT OF THE CELLULAR NETWORK COVERAGE

This Non-Provisional application claims the benefit of U.S. Provisional Application No. 61/696,776 filed on Sep. 4, 2012. The entire contents of the above application is hereby incorporated by reference.

TECHNICAL FIELD

The present invention is directed to a method and an apparatus for use in a wireless communication system. Specifically, the present invention is directed to a method and an apparatus of providing a proximity-based service for public safety even when there are one or more user equipments located outside the cellular network coverage, namely, not being served by the cellular network.

BACKGROUND ART

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) and the like.

DISCLOSURE

Technical Problem

An object of the present invention is to provide a method and an apparatus of efficiently providing a Proximity-based Service (ProSe), in particular Public Safety ProSe, when one or more user equipments are not being served by the cellular network.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the present invention, a method of performing a Proximity-based Service (ProSe) by a Public Safety ProSe-enabled User Equipment (UE) in a cellular communication system is provided, wherein the Public Safety ProSe-enabled UE is a member of a ProSe Group and at least one UE of the ProSe Group is not served by a cellular network. In addition, the method comprises: checking whether the Public Safety ProSe-enabled UE is in a location served by the cellular network; and transmitting first information related to the ProSe Group from the ProSe Group to the cellular network if a condition is satisfied.

Preferably, the Public Safety ProSe-enabled UE may be a leader UE of the ProSe Group.

Preferably, the method may further comprise: informing a leader UE of the ProSe Group that the Public Safety ProSe-enabled UE is in a state that can be served by the cellular network, if the UE is in the location served by the cellular network; and receiving a first control signal from the leader UE, wherein the first control signal indicates the Public Safety ProSe-enabled UE to convey the first information related to the ProSe Group.

Preferably, the method may further comprise: receiving a second control signal from the cellular network, wherein the second control signal indicates the Public Safety ProSe-enabled UE to convey second information related to the ProSe Group from the cellular network to the ProSe Group, wherein the second information is information to be received from the cellular network; and transmitting the second information related to the ProSe Group from the cellular network to the ProSe Group, after receipt of the second control signal.

Preferably, the method may further comprise: informing the leader UE that the Public Safety ProSe-enabled UE is not served by the cellular network, if the Public Safety ProSe-enabled UE moves into a location not served by the cellular network.

Preferably, the method may further comprise: stopping conveying the first and second information related to the ProSe Group between the cellular network and the ProSe group, after informing the leader UE that the Public Safety ProSe-enabled UE is not served by the cellular network.

Preferably, the Public Safety ProSe-enabled UE may run a timer at a time when the informing step is performed, and the condition is satisfied when the first control signal is received before the timer expires.

Preferably, a value of the timer may be configured by a Public Safety center connected to the network.

Preferably, the condition may be satisfied when the UE has any stored information related to the ProSe Group.

As another aspect of the present invention, a Public Safety Proximity-based Service (ProSe)-enabled User Equipment (UE) configured to perform a ProSe in a wireless communication system is provided, wherein the Public Safety ProSe-enabled UE is a member of a ProSe Group and at least one UE of the ProSe Group is not served by a cellular network. In addition, the Public Safety ProSe-enabled UE comprises: a radio frequency (RF) unit; and a processor, wherein the processor is configured: to check whether the Public Safety ProSe-enabled UE is in a location served by the cellular network, and to transmit first information related to the ProSe Group from the ProSe Group to the cellular network if a condition is satisfied.

Preferably, the Public Safety ProSe-enabled UE may be a leader UE of the ProSe Group.

Preferably, the processor may be further configured: to inform a leader UE of the ProSe Group that the Public Safety ProSe-enabled UE is in a state that can be served by the cellular network, if the UE is in the location served by the cellular network, and to receive a first control signal from the leader UE, wherein the first control signal indicates the Public Safety ProSe-enabled UE to convey the first information related to the ProSe Group.

Preferably, the processor may be further configured: to receive a second control signal from the cellular network, wherein the second control signal indicates the Public Safety ProSe-enabled UE to convey second information related to the ProSe Group from the cellular network to the ProSe Group, wherein the second information is information to be received from the cellular network, and to transmit the second information related to the ProSe Group from the cellular network to the ProSe Group, after receipt of the second control signal.

Preferably, the processor may be further configured: to inform the leader UE that the Public Safety ProSe-enabled UE is not served by the cellular network, if the Public Safety ProSe-enabled UE moves into a location not served by the cellular network.

Preferably, the processor may be further configured: to stop conveying the first and second information related to the ProSe Group between the cellular network and the ProSe group, after informing the leader UE that the Public Safety ProSe-enabled UE is not served by the cellular network.

Preferably, the Public Safety ProSe-enabled UE may run a timer at a time when the informing step is performed, and the condition is satisfied when the first control signal is received before the timer expires.

Preferably, a value of the timer may be configured by a Public Safety center connected to the network.

Preferably, the condition may be satisfied when the UE has any stored information related to the ProSe Group.

Advantageous Effects

Exemplary embodiments of the present invention have the following effects. In accordance with the embodiments of the present invention, a Proximity-based Service (ProSe), in particular Public Safety ProSe, can be efficiently provided, when one or more user equipments are not being served by the cellular network.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
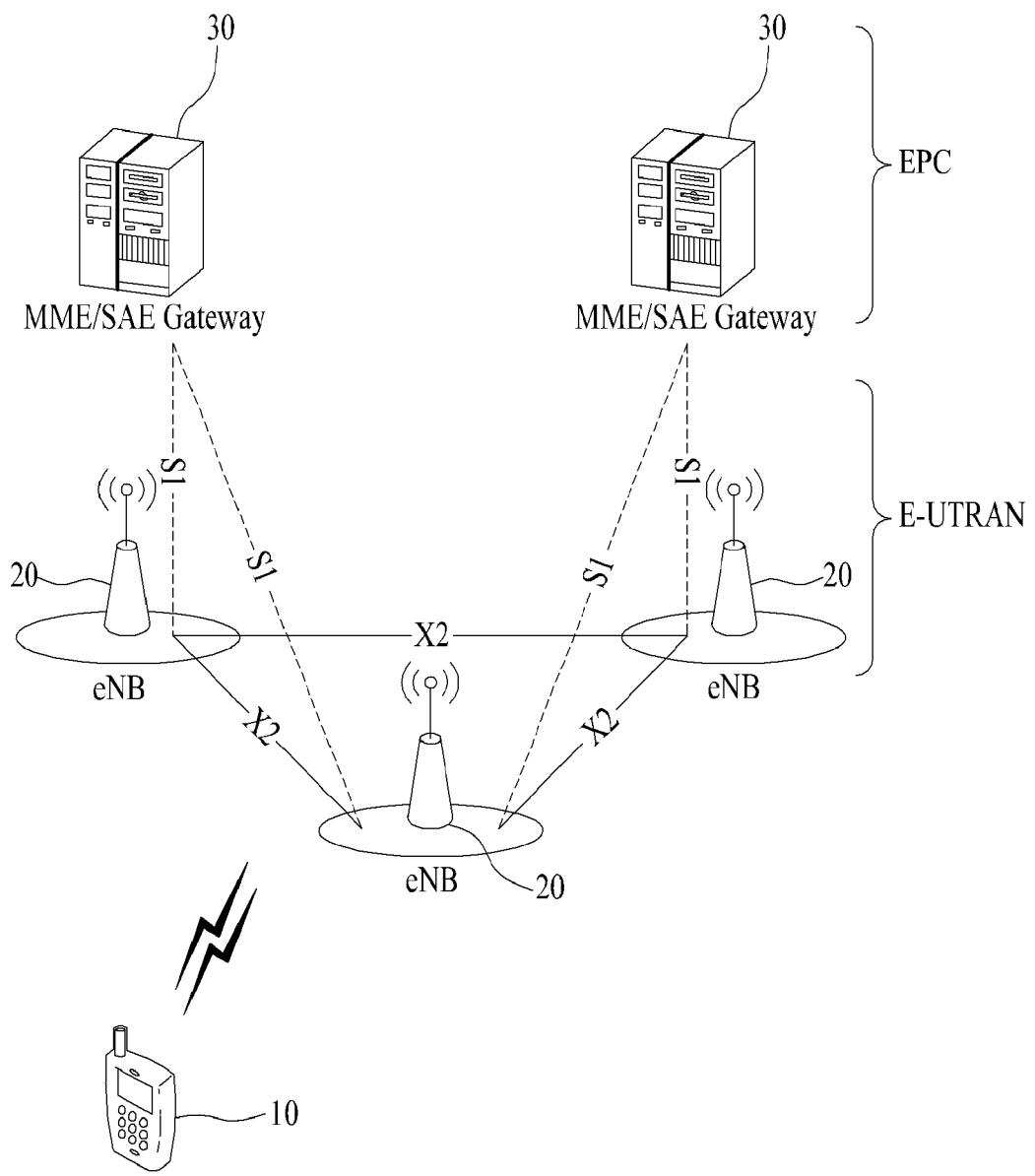
FIG. 1 illustrates a network structure of an Evolved Universal Terrestrial Radio Access Network (E-UTRAN).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

Referring to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20.

Here, "downlink (DL)" refers to communication from the eNB 20 to the UE 10, and "uplink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. Th e eNBs 20 may be connected to each other via an X2 interface and neighboring eNBs may have a meshed network structure that has the X2 interface.

Figure 2:
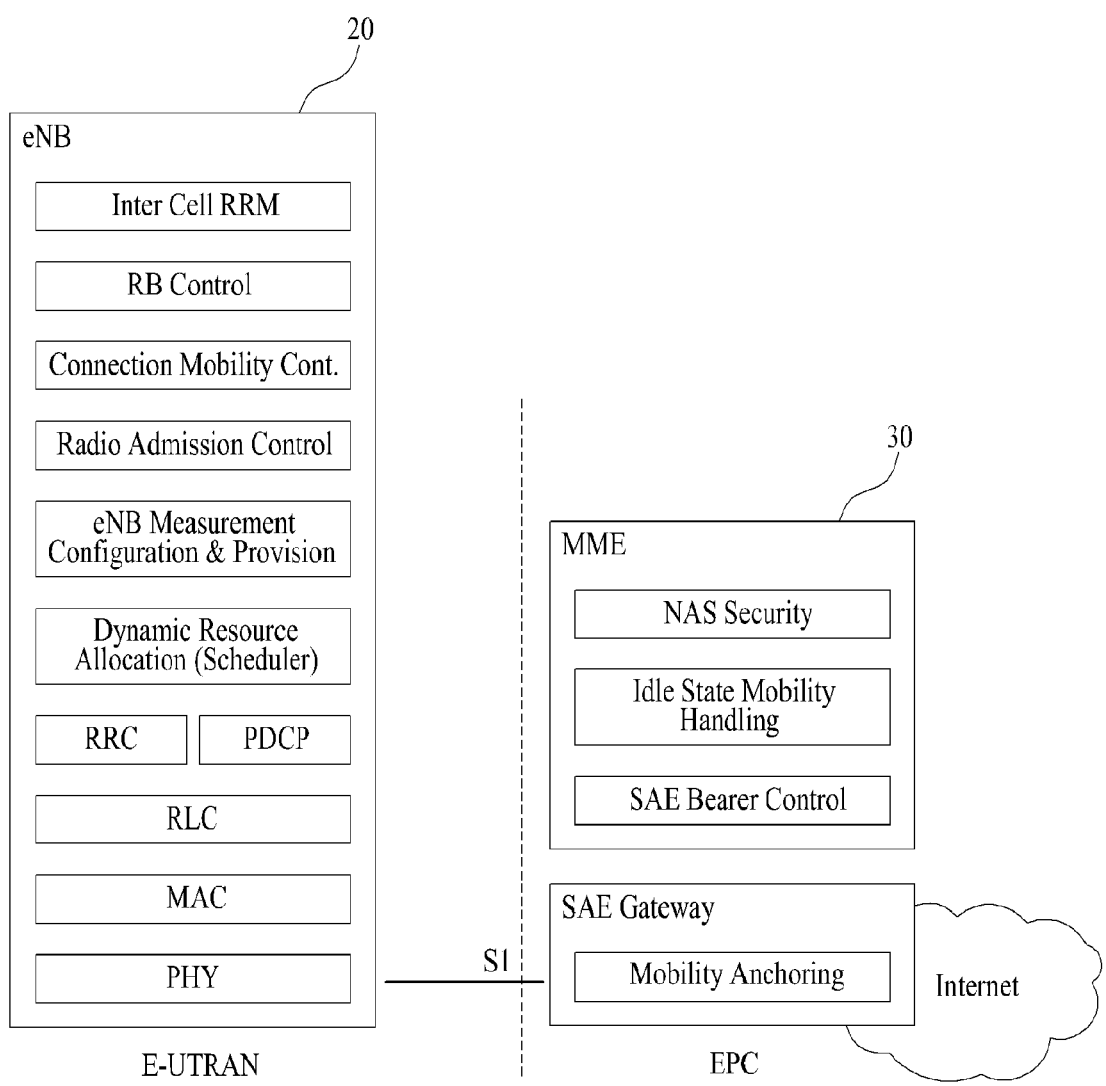
FIG. 2 illustrates a general functional structure of a typical E-UTRAN and that of a typical Evolved Packet Core (EPC).

FIG. 2 is a block diagram depicting general structures of an E-UTRAN and an EPC. Referring to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
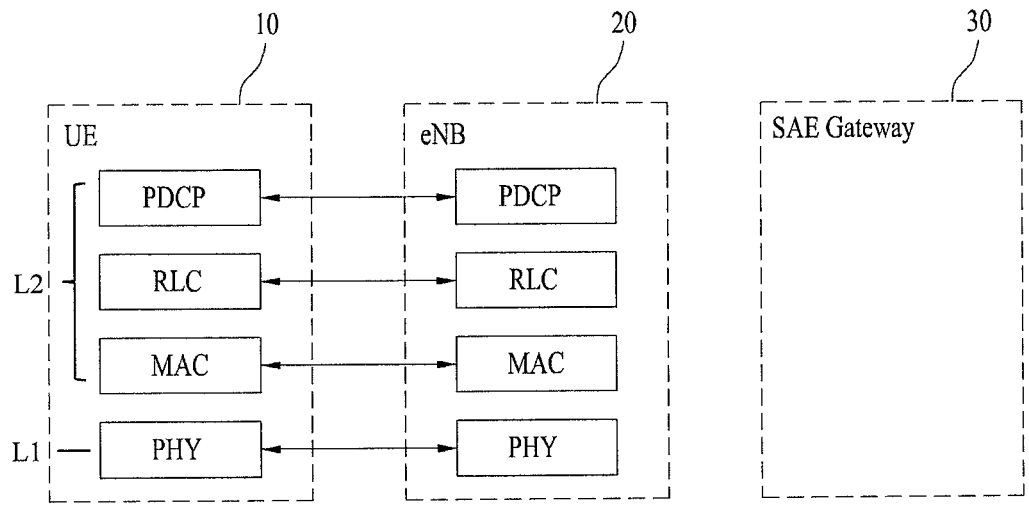
FIGS. 3a~3b illustrate a user-plane protocol and a control-plane protocol stack for the E-UMTS network
Figure 3B:
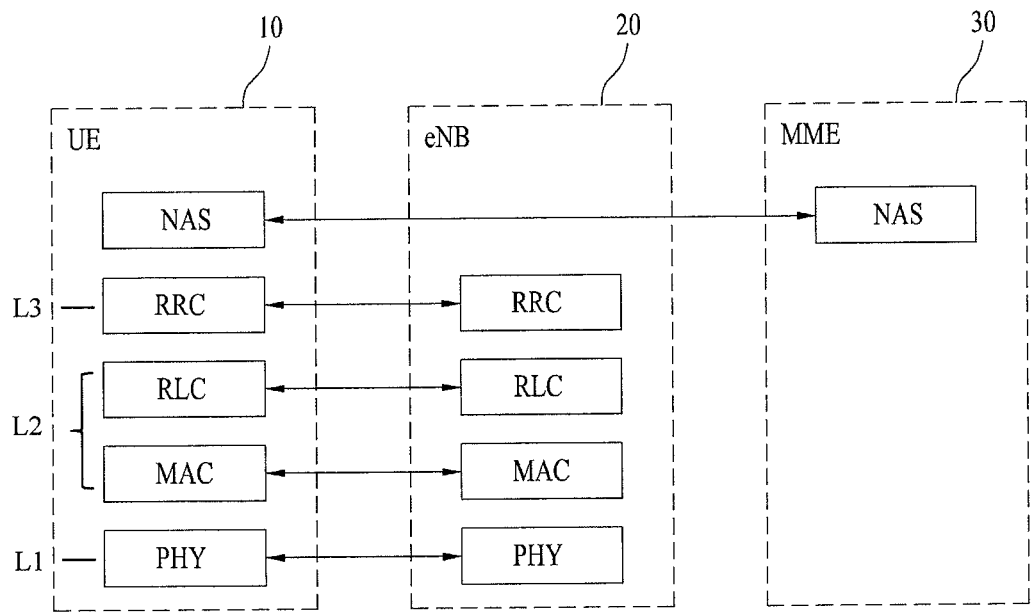

FIGS. 3*a*~3*b* illustrate the user-plane protocol and the control-plane protocol stack for the E-UMTS network. Referring to FIGS. 3*a*~3*b*, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3*a*~3*b* as being separate from the MAC layer, it is understood that the functions of the RLC layer may be performed by the MAC layer and that, therefore, a separate RLC layer is not required. Referring to FIG. 3*a*, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

Referring to FIG. 3*b*, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

Referring to FIG. 3*a*, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

Referring to FIG. 3*b*, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution-Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, and the network can control mobility (handover) of the UE.

Figure 4:
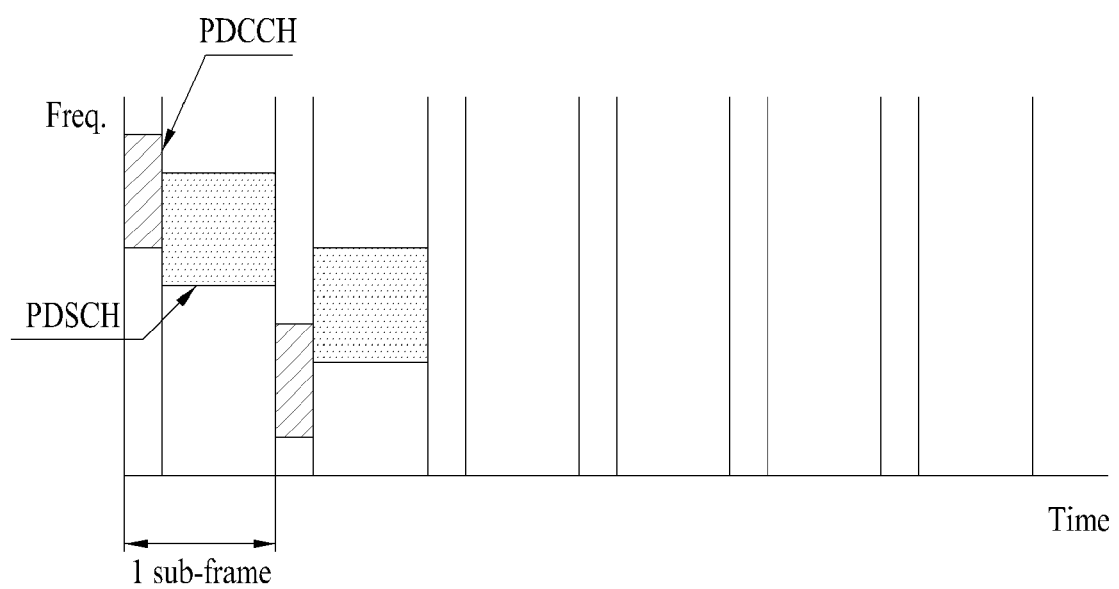
FIG. 4 illustrates a downlink subframe and physical channels.

FIG. 4 illustrates a downlink subframe and physical channels.

Referring to FIG. 4, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE/LTE-A, for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

To initiate access to the network, a random access procedure is used. The random access procedure is also referred to as a Random Access Channel (RACH) procedure. Physical Random Access Channel (PRACH) transmission is under control of higher layer protocol which performs some important functions related to priority and load control. The PRACH is a common physical channel dedicated to the random access procedure. There are two kinds of RACH procedures: contention-based RACH procedure and non-contention-based RACH procedure. In the contention-based RACH procedure, many UEs can attempt to access the same base station simultaneously using same RACH preamble/resources, which may lead to network access congestions/collisions. Hereinafter, unless mentioned otherwise, a RACH (or RA) procedure means a contention-based RACH (or RA) procedure.

A RACH procedure can be used for several purposes. For example the RACH procedure can be used to access the network, to request resources, to carry control information, to adjust the time offset of the uplink in order to obtain uplink synchronization, to adjust the transmitted power, etc.

A RACH procedure can be initiated by the UE or the eNB. The RACH procedure may, for instance, be triggered by the following events:

A UE switches from power-off to power-on and needs to be registered to the network.

A UE is not time-synchronized with an eNB and starts transmitting data (for instance the user calls).

An eNB starts transmitting data to the UE but they are not synchronized (for instance the user receives a call).

An eNB measures a delay of the received signal from the UE (for instance the user is moving and has lost synchronization).

Figure 5:
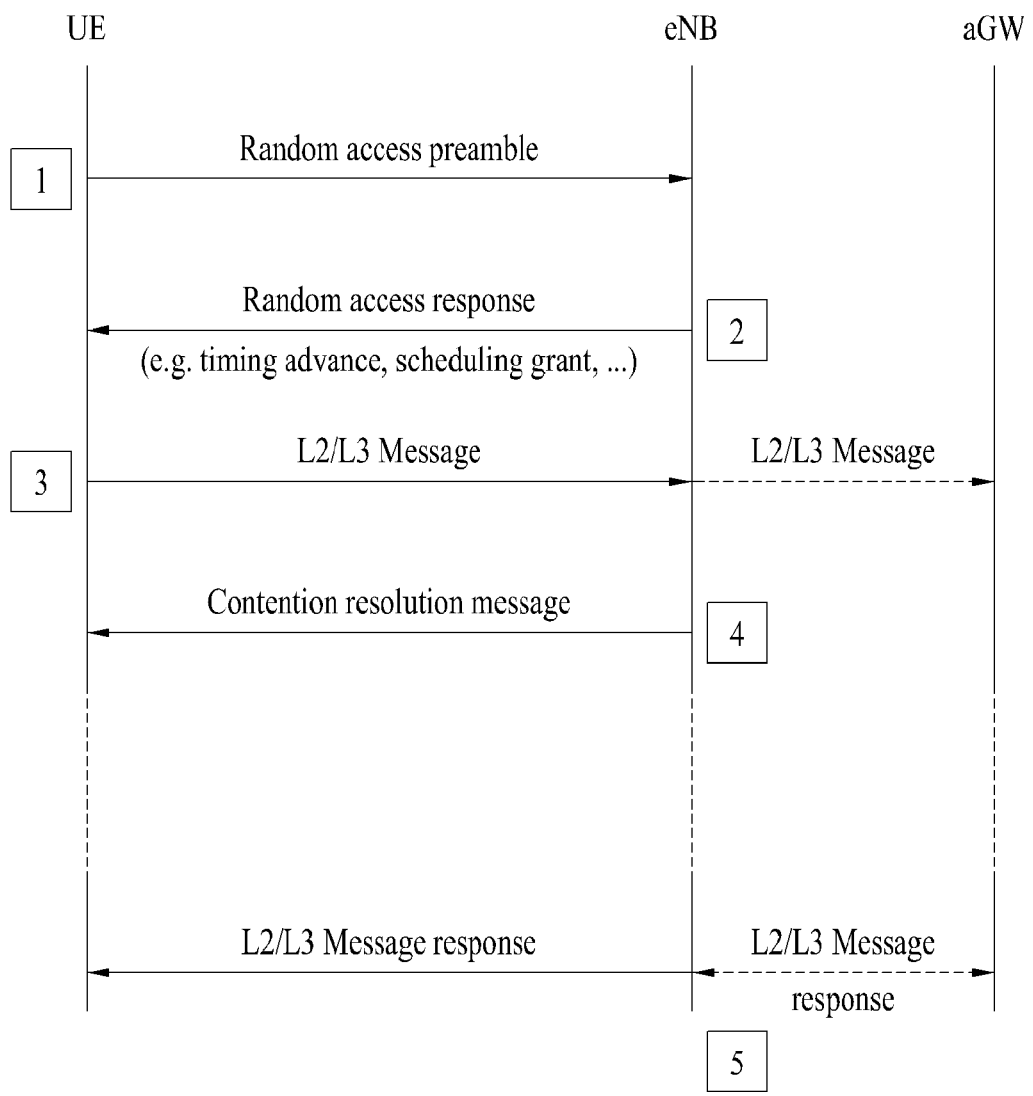
FIG. 5 illustrates a contention-based random access procedure.

FIG. 5 illustrates a contention-based random access procedure.

Referring to FIG. 5, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response and adapts UL transmission timing, and UL transmission power if the random access response contains power control information. The UE then sends a resource request message (message 3, box 3) via an uplink shared channel. In the message 3, the UE requests bandwidth and time resources to transmit data and it also indicates a UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with a UE-specific signature, the eNB checks how many UEs were detected with the same signature and resolves any possible contentions. If the preamble sent by a UE was in collision with a preamble from another UE, the eNB sends a contention resolution message (message 4, box 4) to command a corresponding UE to restart the RACH procedure. If the UE was not in collision, the eNB sends a resource assignment message (message 5, box 5). Subsequent transmissions are carried out as usual.

Proximity-Based Service (ProSe)

Recently, Proximity-based Service (ProSe) has been discussed in 3GPP. The ProSe enables different UEs to discover each other (if authorized to do so) and to be connected (directly) to each other (after appropriate procedure(s), such as authentication), connected through a local eNB only (but not further through Serving Gateway (SGW)/Packet Data Network Gateway (PDN-GW, PGW)), or connected through SGW/PGW (this is referred to as EPC (Evolved Packet Core) Path in 3GPP Release 12).

Figure 6:
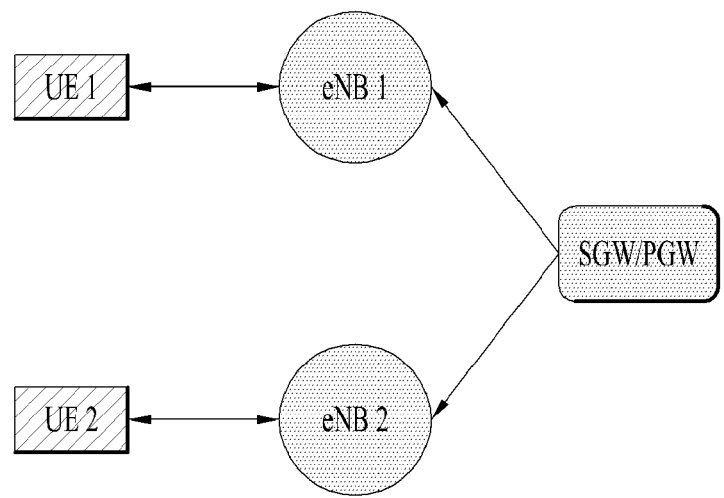
FIGS. 6~8 illustrate examples of data path scenarios for a proximity communication.
Figure 7:
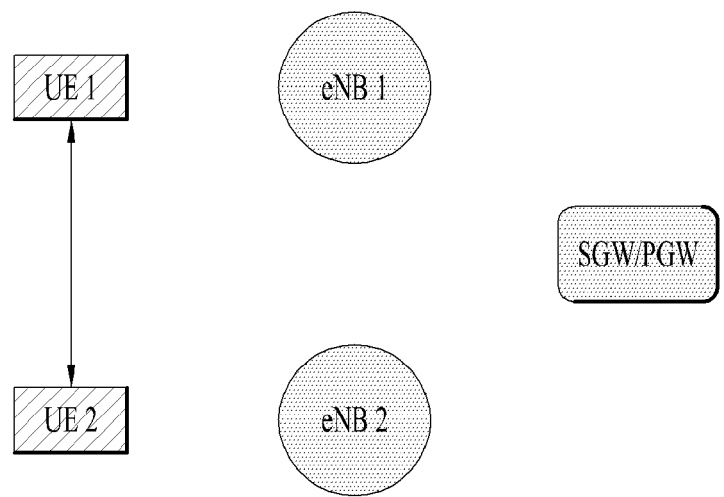
Figure 8:
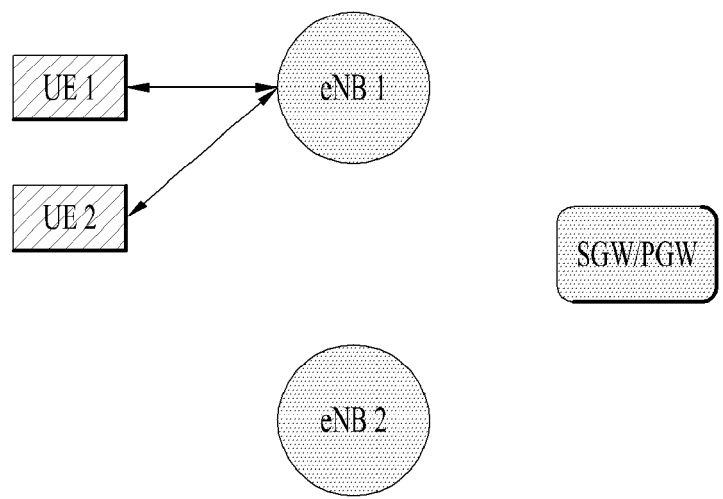

FIGS. 6~8 illustrate Communication Path (or data path) scenarios for a proximity-based service.

FIG. 6 shows an EPC Path (or a default data path) in Evolved Packet System (EPS) for communication between two UEs (Scenario 1). When two UEs (e.g., UE1, UE2) in close proximity communicate with each other, their data path (user plane) goes via the operator network. Typical data path for this type of communication involves eNB(s) and/or Gateway(s) (GW(s)) (e.g., SGW/PGW). FIGS. 7-8 show ProSe Communication Paths for a proximity communication (Scenario 2). If wireless devices (e.g., UE1, UE2) are in proximity of each other, they may be able to use a direct ProSe Communication Path (FIG. 7) or a locally routed ProSe Communication Path (FIG. 8) for communication between two UEs. In the direct ProSe Communication Path, wireless devices are connected directly each other (after appropriate procedure(s), such as authentication), without being connected to/through eNB and SGW/PGW. In the locally routed ProSe Communication Path, wireless devices are connected to each other through a local eNB only but not through the SGW/PGW.

The ProSe has various use cases and potential requirements for an operator network controlled discovery and communications between wireless devices that are in proximity, under continuous network control, and are served by E-UTRAN, for:
 1. Commercial/social use
 2. Network offloading
 3. Public Safety
 4. Integration of current infrastructure services, to assure the consistency of the user experience including reachability and mobility aspects
 5. Public Safety, in case of absence of E-UTRAN coverage (subject to regional regulation and operator policy, and limited to specific public-safety designated frequency bands and terminals)

EXAMPLE

Network Assisted Public Safety ProSe

Proximity-based Service (ProSe) is useful especially for Public Safety use cases. Public Safety has a wide spectrum of applications. For example, in the United States, it includes the following:
 Fire and Rescue services—includes fire prevention and suppression, all types of rescue services.
 Ambulance and Emergency Medical Service (EMS)—usually only provides emergency medical transportation
 Police and security guard licensing services—including crime prevention, suppression and investigation, uniformed patrol and response, and operates the Crimestoppers Program.
 Emergency communications—operates the public interface emergency communications telephone system by providing the 9-1-1 and Enhanced 911 emergency telephone numbers.
 Office of Emergency Services (OES)—plans for and operates the Emergency Operations Center during calamities, disasters, special events and emergencies.
 Inspections and code enforcement—usually building safety, which includes construction, electrical et al. and/or vehicle inspections.
 Animal control—This category could also include wildlife officers, game wardens and dog catchers.
 DMV—includes administration of driver's licenses and license plates.

With the use of setting up direct communication path between two or more Public Safety ProSe-enabled UE's, the ProSe can realize the concept of "mobile ad hoc" network (so-called Mobile Network, MONET) even out of the cellular network coverage area.

When a group of Public Safety ProSe-enabled UEs are dispatched to the area of interest, they are supposed to be out of the cellular network coverage area: for example, some incident happened in an area out of cellular network radio coverage (i.e., an area not served by the cellular network). However, in practical situations, some of the Public Safety ProSe-enabled UEs can move around so that they can get into an area with cellular network radio coverage (i.e., an area served by the cellular network). Thus the present invention proposes to use cellular network-assisted functions and/or information (simply, network-assisted function(s)) for a Public Safety ProSe, when one or more of Public Safety ProSe-enabled UEs are coming into the cellular network coverage area. Network-assisted functions and/or information may be useful in performing the Public Safety ProSe. Here, the network-assisted functions may mean functions involving the cellular network (e.g., a network node such an eNB, a Public Safety center, etc.). The Public Safety Center (e.g., Public Safety Answering Point, PSAP) may be deployed outside the cellular network. When the Public Safety Center is deployed outside the cellular network, the Public Safety Center may be connected to the cellular network and communicate with Public Safety ProSe-enabled UEs via the cellular network. And, the network-assisted information may mean information originated from the cellular network (e.g., a network node such an eNB, a Public Safety center, etc.), or information accompanied by the network-assisted functions.

For example, the network-assisted function may include:
 (Secure) delivery of stored information from a workspace (e.g., one or more Public Safety Prose-enabled UEs in the workspace, preferably, a leader UE in a corresponding Public Safety ProSe group) to a Public Safety center. The delivery can be performed from the leader UE in the Public Safety ProSe group to the Public Safety center via a non-leader UE of the Public Safety ProSe group.
 (Instantaneous) delivery of new or modified order from the Public Safety center to the workspace (e.g., one or more Public Safety Prose-enabled UEs in the workspace, preferably, a leader UE in a corresponding Public Safety ProSe group. The delivery can be performed from the Public Safety center to the leader UE in the Public Safety ProSe group via a non-leader UE of the Public Safety ProSe group.

(Instantaneous) delivery of newly originated request from the workspace (e.g., one or more Public Safety Prose-enabled UEs in the workspace, preferably, a leader UE in a corresponding Public Safety ProSe group) to the Public Safety center. The delivery can be performed from the leader UE in the Public Safety ProSe group to the Public Safety center via a non-leader UE of the Public Safety ProSe group.

Figure 9:
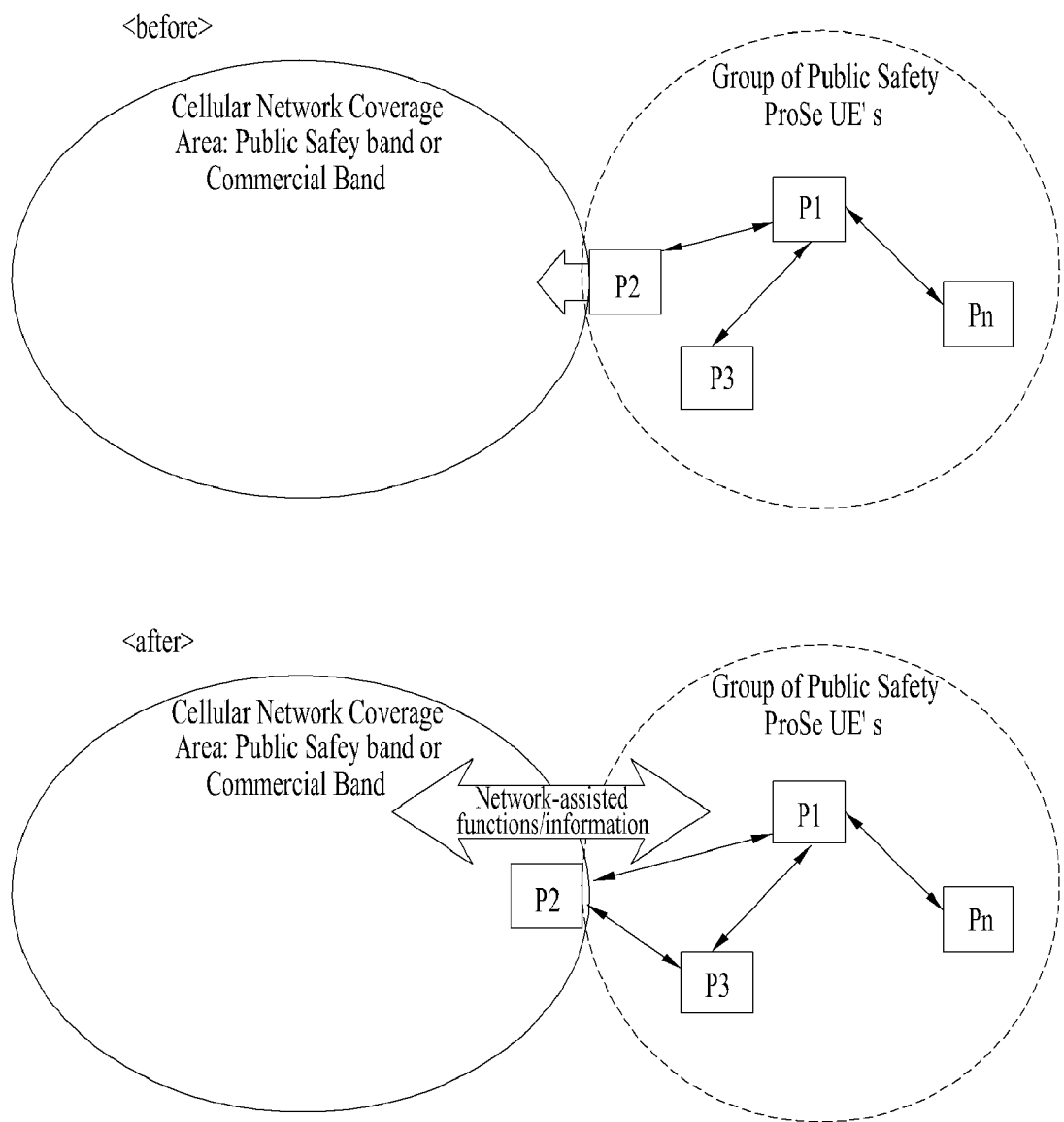
FIG. 9 illustrates a network-assisted Public Safety ProSe procedure in accordance with an example of the present invention.

FIG. 9 illustrates a network-assisted Public Safety ProSe in accordance with an example of the present invention. FIG. 9 may show a situation that a fire occurs in an area out of a cellular network coverage, and Public Safety ProSe-enabled UEs (P1, P2, ..., Pn) are dispatched. At the workplace for the fire, each of the Public Safety ProSe-enabled UEs (P1, P2, ..., Pn) (n≥2) may perform a discovery procedure in order to find available Public Safety ProSe-enabled UE(s), and then may form a Public Safety ProSe group (simply, a ProSe group, or a group) or join into an existing Public Safety ProSe group. It is assumed that P1 is a leader of the ProSe group, and P2, ..., Pn are members of the ProSe group.

Referring to FIG. 9, when all of the members of the ProSe group are out of the cellular network coverage (i.e., an area not served by E-UTRAN), the Public Safety ProSe is performed without assistance of the cellular network. However, when at least one member of the ProSe group (e.g., P2) is coming into the cellular network coverage area, in accordance with the present invention, network-assisted functions and information are available for the Public Safety ProSe. The cellular network may support a commercial band and a Public Safety band. Proposed network-assisted ProSe may be performed basically using the Public Safety band, but if there is need for further resource allocation, the commercial band may be also used for the proposed network-assisted ProSe. A Public Safety ProSe-enabled UE may determine whether it is in an area of cellular network coverage or not (i.e., whether it is served by E-UTRAN or not), based on how long a signal strength from an eNB exceeds a threshold value.

In order to make the aforementioned functions (but not limited to them) technically feasible to operate in Public Safety ProSe, it may be required to have the following conditions prepared with the Public Safety ProSe-enabled UE (e.g., P2).

Condition 1. If a Public Safety ProSe-enabled UE comes into a cellular network coverage area, the Public Safety ProSe-enabled UE may need to be able to continue the Public Safety ProSe functions it has been working on. For this end, ongoing Public Safety ProSe functions or configurations have a higher priority over what will happen (e.g., operations related with the network-assisted functions/information), if there is no explicit notification from a master of the group (i.e., group leader UE). Thus, for example, in accordance with a notification from the group leader UE or a predetermined priority, the ongoing Public Safety ProSe functions can be stopped, if the Public Safety ProSe-enabled UE comes into the cellular network coverage area and if network-assisted function needs to be performed. Also, in accordance with a notification from the group leader UE or a predetermined priority, performing the network-assisted function may be hold until the ongoing Public Safety ProSe functions are completed. Exemplary cases for Public Safety ProSe are described below. Based on the cases, ongoing Public Safety ProSe functions or configurations can be given accordingly.

a. ProSe Discovery Within Network Coverage: a scenario where a given UE discovers one or more other UEs while in E-UTRAN coverage, with ProSe Discovery always enabled.

b. ProSe Discovery Out of Network Coverage: a scenario where a given UE discovers one or more other UEs while out of E-UTRAN coverage, with ProSe Discovery always enabled.

c. Can Discover But Not Discoverable: a scenario where a given UE is able to discover other UEs, but is not discoverable by other UEs. This may be usable for the case when some of the Public Safety ProSe-enabled UE's are within the network coverage.

d. Basic ProSe One-to-One Direct User Traffic Initiation in Public Safety Spectrum Dedicated to ProSe: a scenario where a given public safety UE initiates one-to-one direct user traffic session with another UE.

e. UE with Multiple One-to-One Direct User Traffic Sessions in Public Safety Spectrum Dedicated to ProSe: a scenario where a given UE can concurrently maintain one-to-one user traffic sessions with several other UEs.

f. ProSe Group: a scenario where a user wants to communicate the same information concurrently to two or more other users using ProSe Group Communications. The UEs of all users in the scenario belong to a common communications group.

g. ProSe Broadcast: a scenario where a given UE initiates a ProSe Broadcast Communication transmission to all UEs within transmission range.

h. ProSe Relay: a scenario where a given UE acts as a communication relay for one or more UEs i. ProSe Hybrid and Range Extension: a scenario where a given UE communicates using the network infrastructure and using ProSe Communications concurrently. This also describes a scenario where a given UE acts as a communication relay for one or more UEs so that the latter UE(s) can get communication towards the network.

j. ProSe Range: a scenario where a given UE is within a building and uses ProSe Communications to exchange user traffic to/from UEs outside of a building.

k. Public Safety Implicit Discovery: a scenario for Public Safety ProSe in which public safety officials need to communicate without an explicit ProSe Discovery event.

Condition 2. If a Public Safety UE comes into a cellular network coverage area, the UE may need to be able to deliver a primitive set of information to the network node (e.g., eNB, Public Safety center) and a second set of information to the network node after authentication and/or integrity protection check-up has been successfully completed.

Figure 10:
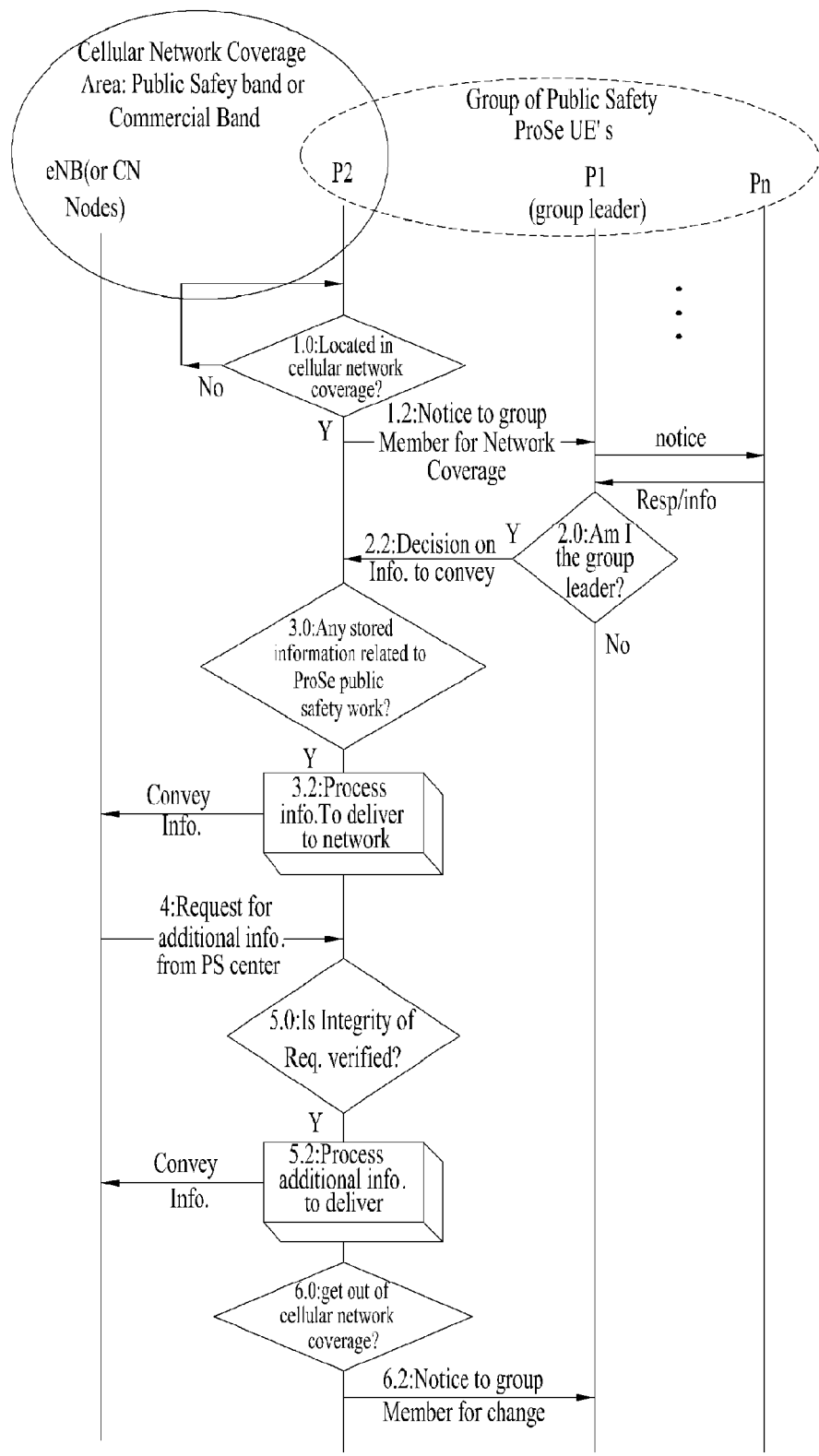
FIG. 10 illustrates a flow diagram of the network-assisted Public Safety ProSe procedure.

FIG. 10 is a flow chart showing a network-assisted Public Safety ProSe in accordance with another example of the present invention. FIG. 10 supports network-assisted functions for Public Safety ProSe when some of the group members come into cellular network coverage area. In this example, two preconditions are assumed: (i) Public Safety ProSe-enabled UEs P1, P2, ..., Pn are registered to a Public Safety center, and (ii) Public Safety ProSe-enabled UEs P1, P2, ..., Pn are out of the cellular network coverage area.

Referring to FIG. 10, each Public Safety ProSe-enabled UE may be able to perform some or all of the followings. It is assumed that P2 is picked up for a reference UE ("myself").

Step 1.0: P2 may check if "myself" is located in a cellular network coverage area, i.e. if "myself" can be served by a cellular network (e.g., E-UTRAN). The check operation may be performed periodically. Alternatively, the check operation may be turned on/off in accordance with indication of a leader of the group (e.g., P1). Alternatively, the check operation is triggered if there is stored information to be transmitted to the cellular network (e.g., a network node such as an eNB, a Public Safety Center) but if there is no group member which is in an area of the cellular network (i.e., if there is no group member that can be served by the cellular network). In this case, the check operation may be pending until any one group member is coming into the cellular network coverage area.

Step 1.2: If a result of the check operations is YES (i.e., "myself" can be served by the cellular network), then P2 may send "Notice" (e.g., I get network connection) to the group members in ProSe proximity. After sending "Notice", P2 may run a timer (e.g., T1xxx). A value of the timer may be configured by a Public Safety center connected to the cellular network. If "myself" is the leader of the group, it can notice to the members for this fact/news.

Steps 2.0~2.2: If "myself" is not a leader of the group, the leader of the group (e.g., P1) may convey control information including "Decision on Information to convey" to P2. The control information may define the scope of authorization for the "P2" (the Public Safety ProSe-enabled UE who came into network coverage), e.g., how much the Public Safety ProSe-enabled UE can convey to the network node (or Public Safety center). The scope can include the definition about (1) what information can be sent out without authentication/integrity check, and (2) what information can be sent out only with authentication/integrity check is successfully completed.

Steps 3.0~3.2: If "myself" (i.e., P2) receives the control information including the "Decision on information to convey" within a certain time, T_threshold, P2 may follow the definition/scope given by the "Decision on information to convey". For example, P2 may check if there is any stored information related to ProSe Public Safety work, then if yes, P2 may process information to be delivered to the cellular network. T_threshold can be preconfigured by the Public Safety center via offline or online methods, or by the leader of the group. Meanwhile, if "myself" (i.e., P2) receives the control information including the "Decision on information to convey" after a certain time, T_threshold passed, P2 may ignore the "Decision on information to convey", and then return to the step 1.0.

Steps 4.0~5.0: If there is a Request for Additional Information from the Public Safety center, the "myself" (i.e., P2) can check the integrity of the Request.

Step 5.2: Upon successful completion of authentication or integrity check, P2 can send out additional information to the network node (e.g., an eNB, a Public Safety center).

Steps 6.0~6.2: P2 may check if "myself" is out of the cellular network coverage area, i.e. if "myself" is not served by the cellular network (e.g., E-UTRAN). If a result of the check operations is YES (i.e., "myself" is not served by the cellular network), then P2 may send "Notice" (e.g., I get out of cellular network coverage) to the group members in ProSe proximity.

Figure 11:
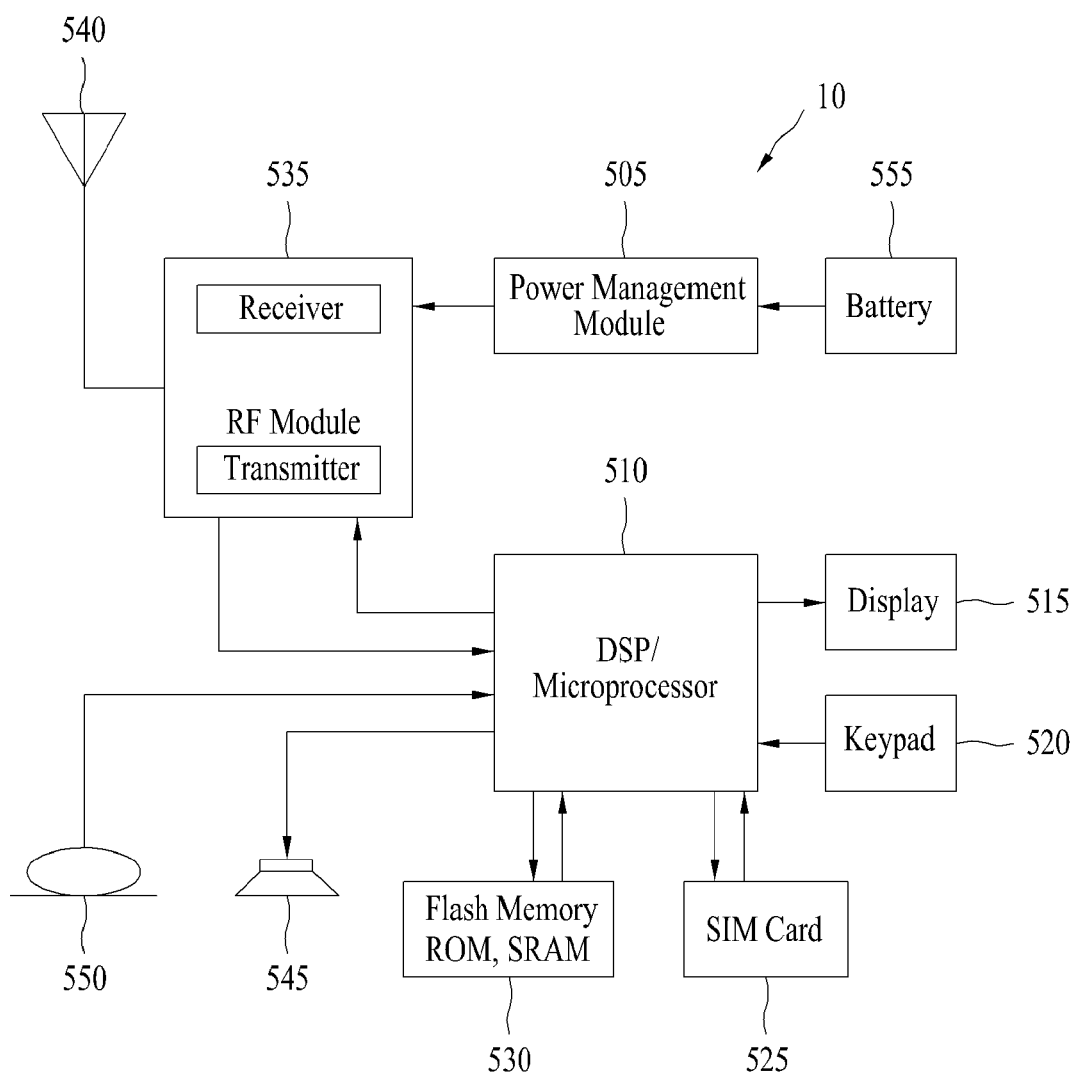
FIG. 11 illustrates a block diagram of a User Equipment (UE).

FIG. 11 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a proximity-based service, specifically, a proximity-based service for public safety.

The invention claimed is:

1. A method of performing a Proximity-based Service (ProSe) by a Public Safety (PS) ProSe-enabled User Equipment (UE) in a cellular communication system, wherein the PS ProSe-enabled UE is a member of a ProSe Group, the method comprising:
    triggering a check operation for checking whether the PS ProSe-enabled UE is in a location served by the cellular network when there is first information related to the ProSe Group to be conveyed to the cellular network and any member of the ProSe Group is not in the location served by the cellular network;
    transmitting a notice to a leader UE of the ProSe Group for infoiiiiing that the PS ProSe-enabled UE is in a state that can be served by the cellular network when the PS ProSe-enabled UE is in the location served by the cellular network as a result of the check operation;
    running a timer at a time when the notice is transmitted to the leader UE; and
    receiving a first control signal from the leader UE as a response to the notice, wherein the first control signal instructs the PS ProSe-enabled UE to convey the first information from the ProSe Group to the cellular network,
    wherein if the first control signal is received on or before the timer expires, the first information is conveyed from the ProSe Group to the cellular network according to the first control signal, and
    wherein if the first control signal is received after the timer expires, the first control signal is ignored and the first information is not conveyed from the ProSe Group to the cellular network.

2. The method of claim 1, further comprising:
    receiving a second control signal from the cellular network, wherein the second control signal instructs the PS ProSe-enabled UE to convey second information related to the ProSe Group from the cellular network to the ProSe Group, wherein the second information is information to be received from the cellular network; and
    transmitting the second information related to the ProSe Group from the cellular network to the ProSe Group, after receipt of the second control signal.

3. The method of claim 2, further comprising:
    informing the leader UE that the PS ProSe-enabled UE is not served by the cellular network, if the PS ProSe-enabled UE moves into a location not served by the cellular network.

4. The method of claim 1, wherein a value of the timer is configured by a PS center connected to the network.

5. A Public Safety (PS) Proximity-based Service (ProSe)-enabled User Equipment (UE) configured to perform a ProSe in a wireless communication system, wherein the PS ProSe-enabled UE is a member of a ProSe Group, the PS ProSe-enabled UE comprising:
    a radio frequency (RF) unit; and
    a processor, wherein the processor is configured:
        to trigger a check operation for checking whether the PS ProSe-enabled UE is in a location served by the cellular network when there is first information related to the ProSe Group to be conveyed to the cellular network and any member of the ProSe Group is not in the location served by the cellular network,
    to transmit a notice to a leader UE of the ProSe Group for informing that the PS ProSe-enabled UE is in a state that can be served by the cellular network when the PS ProSe-enabled UE is in the location served by the cellular network as a result of the check operation,
    to run a timer at a time when the notice is transmitted to the leader UE, and
    to receive a first control signal from the leader UE as a response to the notice, wherein the first control signal instructs the PS ProSe-enabled UE to convey the first information from the ProSe Group to the cellular network,
    wherein if the first control signal is received on or before the timer expires, the first information is conveyed from the ProSe Group to the cellular network according to the first control signal, and
    wherein if the first control signal is received after the timer expires, the first control signal is ignored and the first information is not conveyed from the ProSe Group to the cellular network.

6. The PS ProSe-enabled UE of claim 5, wherein the processor is further configured:
    to receive a second control signal from the cellular network, wherein the second control signal instructs the PS ProSe-enabled UE to convey second information related to the ProSe Group from the cellular network to the ProSe Group, wherein the second information is information to be received from the cellular network, and
    to transmit the second information related to the ProSe Group from the cellular network to the ProSe Group, after receipt of the second control signal.

7. The PS ProSe-enabled UE of claim 6, wherein the processor is further configured:
    to inform the leader UE that the PS ProSe-enabled UE is not served by the cellular network, if the PS ProSe-enabled UE moves into a location not served by the cellular network.

8. The PS ProSe-enabled UE of claim 5, wherein a value of the timer is configured by a PS center connected to the network.

* * * * *